US005220991A

United States Patent [19]

Yamaguchi et al.

[11] Patent Number: 5,220,991

[45] Date of Patent: Jun. 22, 1993

[54] CONVEYING APPARATUS FOR COATING LINE

[75] Inventors: Shoichi Yamaguchi, Okazaki; Hisashi Shimizu, Tokorozawa; Shigeru Ogino, Kawagoe, all of Japan

[73] Assignee: Tsubakimoto Chain Co., Osaka, Japan

[21] Appl. No.: 932,974

[22] Filed: Aug. 20, 1992

[30] Foreign Application Priority Data

Aug. 21, 1991 [JP] Japan .................................. 3-232435

[51] Int. Cl.[5] .............................................. B65G 17/32

[52] U.S. Cl. .................................. 198/377; 104/172.3

[58] Field of Search ............... 198/376, 377, 378, 379, 198/680; 104/172.3, 172.4

[56] References Cited

U.S. PATENT DOCUMENTS 2,598,163 5/1972 Halls ............................... 198/377 X
2,657,666 11/1953 Fowler ............................ 198/377 X
4,513,682 4/1985 Otocki ............................. 198/377 X

FOREIGN PATENT DOCUMENTS 0451336 9/1949 Italy .................................. 198/377
256162 10/1988 Japan .
051168 2/1989 Japan .
159081 6/1989 Japan .

*Primary Examiner*—Robert P. Olszewski
*Assistant Examiner*—James R. Bidwell
*Attorney, Agent, or Firm*—Howson and Howson

[57] ABSTRACT

In a coating line conveyor for an automobile body, in which the body is movable along a path and rotated on an axis parallel to the path, the article is stopped in its erect attitude without impact force. The article is supported so that the combined center of gravity of the article and its supports is located directly below the axis of rotation of the article when the article is erect. Rotation is stopped by removing rotating power from the article supports in response to a signal generated by a sensor when the article is in its erect condition. The article then rocks back and forth under its own inertia and rapidly approaches a stable erect condition by a naturally damped oscillating motion.

1 Claim, 3 Drawing Sheets

CONVEYING APPARATUS FOR COATING LINE

BRIEF SUMMARY OF THE INVENTION

This invention relates to conveyors, and more particularly to improvements in a conveyor for carrying an article such as an automobile body along a coating line and rotating the article while the coating is baked and dried.

In painting an article such as an automobile body on a coating line, it has been found desirable to apply a thick coat of paint in order to reduce the number of coats to be applied and to improve the smoothness of the coated surface. To prevent sagging of the thick coat of paint, drying and baking are effected as the painted article is rotated on a horizontal axis. This procedure produces a high quality coated surface.

When the rotation of the painted article is interrupted or stopped, it is desirable to have the article situated in an erect attitude. In the case of an automobile body, the body should be stopped with the roof section up and with the bottom section down.

A prior technique for effecting stopping of rotation of a painted article is disclosed in Laid-Open Japanese Patent Application No. 51168/1989. As shown in FIGS. 20 to 24 of that application, when an automotive body is in an erect attitude, a roller 67, at the upper end of a control rod assembly, enters a recess 61*a* of a cam 61 which is fixed on a shaft for rotating the automotive body. When a switch 69 (show in FIG. 9), at a monitor position on the coating line, is manually actuated, control rod 62 rises, a clutch 51 is disengaged, and roller 67 enters recess 61*a*, thereby stopping the automotive body when it reaches an erect condition as it rotates under its own inertia. In the Laid-Open Japanese Patent Application, a shock-absorbing spring 63 is built into the control rod assembly between roller 67 and the control rod 62 for the purpose of alleviating shock which occurs as the automotive body stops rotating.

In the above-described prior art technique, as the automotive body, in rotation by virtue of its own inertia, is stopped by compression of the spring acting against the inertial force, it is difficult to eliminate impact force altogether.

The principal object of this invention is t provide an article conveying and rotating mechanism with a simple and effective means for stopping rotation of the article without shock. Another object is to achieve rapid stoppage of rotation of the article. Still another object is to provide for stopping of rotation of the article without interrupting its forward motion.

In accordance with the present invention, impact force is eliminated. The article is supported so that the combined center of gravity of the article and its supports is located directly below the axis of rotation of the article when the article is in its erect attitude. Rotation is stopped by removing rotating power from the article supports in response to a signal generated by a sensor when the article is in its erect condition. The article then rocks back and forth under its own inertia and rapidly approaches a stable erect condition by a naturally damped oscillating motion.

More specifically, the conveying apparatus in accordance with the invention comprises: rail means; a carriage movable along and guided by said rail means, said carriage comprising front and rear upright columns and front and rear rotating shafts mounted respectively in said columns for rotation on a common axis substantially parallel to said rail means; support arm means on said shafts for supporting an article to be painted with the combined center of gravity of said article and said support arm means being directly below said axis when the article is in an erect attitude; conveyor chain means for moving said carriage along said rail means; means providing an endless chain for effecting rotating of said article; said conveyor chain means and said endless chain means being juxtaposed in parallel relationship to each other along said rail means and movable relative to each other at different speeds; sprocket means on said carriage engageable with said endless chain; means connecting one of said rotating shafts in driving relationship to said sprocket means; means for sensing when said article is in an erect attitude, said sensing means being mounted at a predetermined position along said rail means; and means, responsive to said sensing means, for effecting disengagement of said endless chain from said carriage sprocket when the article is in an erect attitude at a predetermined position in the path of said carriage; whereby the rotating force transmitted from said endless chain means to said article is removed when the article is substantially in its erect attitude and said article rapidly approaches a stable erect condition by rocking motions of diminishing magnitude without the application of impact forces.

Further objects, details and advantages of the invention will be apparent from the following description, when read in conjunction with the drawings.

DETAILED DESCRIPTION

Figure 1:
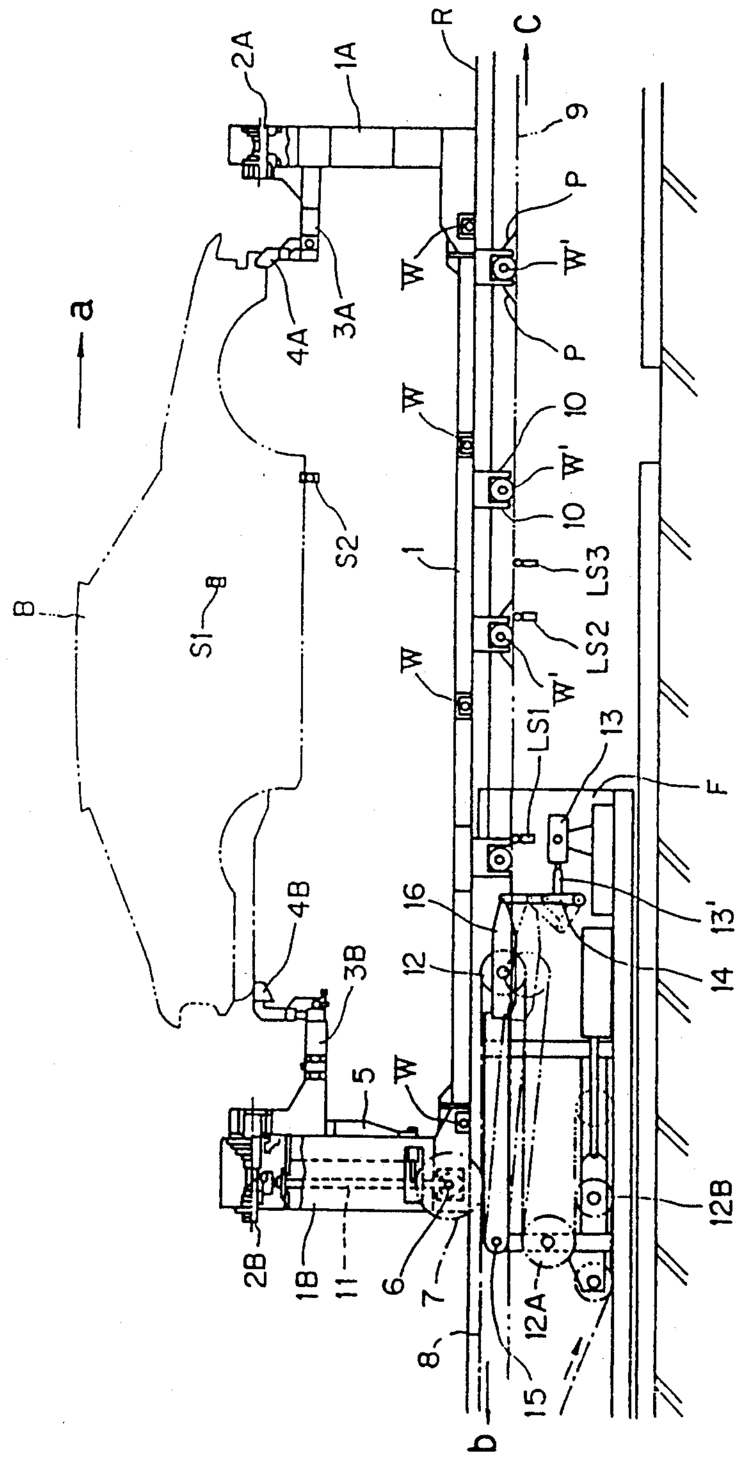
FIG. 1 is a schematic elevational view of a coating line conveyor in accordance with the invention.

As shown in FIG. 1, an automobile body B is conveyed, in the direction of arrow a, along a coating line, by a carriage 1 having a plurality of wheels W for running on rails R laid along the coating line. The carriage is also provided with a plurality of casters W' to allow the carriage to be moved about on a floor. Box-type upright columns 1A and 1B are provided at the front and rear ends of the carriage. In the top end section of these columns rotating shafts 2A and 2B are rotatably mounted on bearings on a common axis parallel to the direction of movement of the carriage along the rails W'. L-shaped rotating support arms 3A and 3B are mounted on the opposed end sections of the rotating shafts. Jigs 4A and 4B, for mounting and supporting the front and rear ends of automotive body B, are provided on the ends of the rotating support arms 3A and 3B respectively. A swinging pendulum-type weight lever 5 is suspended from the rear rotating support arm 3B. The support arms are arranged so that, when the automotive body B is in its erect attitude, i.e. with the roof up, the combined center of gravity of the automotive body B and the rotating support arms 3A and 3B is located directly below the axis of rotation.

In a frame at the lower end of the rear upright column 1B, a cross shaft 6 is rotatably mounted in bearings at a right angle to the direction of travel of the carriage on rails W'. A sprocket 7 is fixed to one end of this cross shaft. Sprocket 7 is engaged with an endless chain 8, which moves in the direction of the arrow b along the baking and drying section of the coating line.

Carriage 1 is conveyed in the direction of the arrow c by pusher dogs P, mounted on a conveyor chain 9, and tiltable to engage lock plates 10 on the carriage. Conveyor chain 9 and endless chain 8 travel in opposite directions so that, when sprocket 7 is engaged with chain 8, the sprocket rotates. In an alternative embodiment, chains 8 and 9 can travel in the same direction, but at different speeds. In either case, the chains travel relative to each other. Accordingly, even if one of chains 8 and 9 fails to operate, the sprocket 7 is rotated as long as the other chain is operating.

A bevel gear (not shown) on sprocket shaft 6 meshes with a mating bevel gear (not shown) mounted on the lower end of a vertical transmission shaft 11 in the interior of the rear upright column 1B, and a third bevel gear (not shown) on the upper end of transmission shaft 11 meshes with a fourth bevel gear (not shown) on rotating shaft 2B. Shaft 2B therefore rotates to turn rotating support arm 3B. Automobile body B is rotated by arm 3B, and shaft 2A on front upright column 1A is rotated through body B, so that the body B and support arms 3A and 3B are rotated as a unit about the common axis of shafts 2A and 2B.

As shown in FIG. 1, endless chain 8 extends over a sprocket 12 at the end of the baking and drying section of the coating line. From sprocket 12, the chain extends back over an intermediate sprocket 12A to a horizontally movable tension sprocket 12B. From sprocket 12B, chain 8 extends to a driving sprocket (not shown), which causes the chain to move in the direction of arrow b.

Sprocket 12 can be raised and lowered. When sprocket 12 is lowered to the position indicated by broken line in FIG. 1, chain 8 inclines downward and disengages sprocket 7. When chain 8 disengages the sprocket, rotating power is removed from automotive body B, and body B gradually comes to rest in an erect attitude after rocking back and forth in a swinging motion about the common axis of shafts 2A and 2B.

Figure 2:
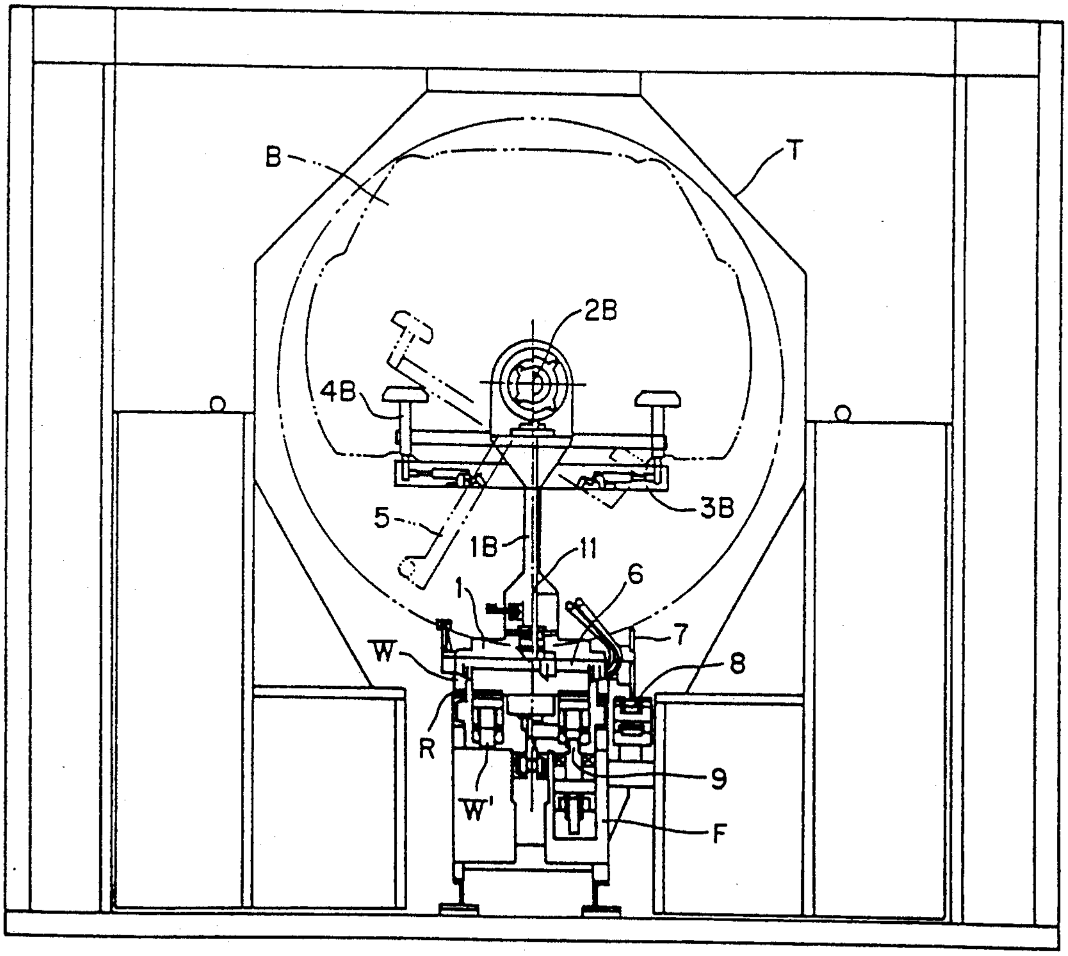
FIG. 2 is an end view of a baking and drying tunnel, showing the conveyor of FIG. 1 and an article to be painted carried thereby.
Figure 3:
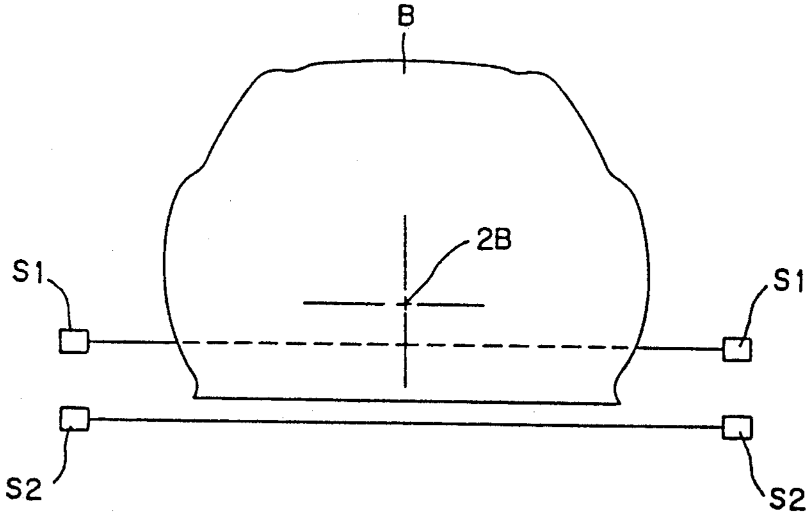
FIG. 3 is a schematic end view explaining the operation of erect attitude sensing means in accordance with the invention.

To minimize the time required for the body to come to a standstill, a sensor is used to issue a signal when the body is in, or close to, its erect position. In response to this signal, sprocket 12 is lowered to disengage chain 8 from the sprocket 7. Operation of the sensor will be explained by referring to FIGS. 1 to 3. At the end of the baking and drying section of the coating line, there are provided upper and lower sensors, each comprising a light beam generator and a photosensitive detector. The upper sensor S1 is a body sensor, which operates when its light beam is interrupted by the body B rotating on the carriage. While the body B is in its erect attitude, the beam of sensor S1 is interrupted. A lower sensor S2 is a bottom level sensor for sensing the level condition of the bottom surface of the body. When body B is erect, the light beam of sensor S2 passes immediately under the bottom of the body. Sensors S1 and S2 are enabled when a limit switch LS1 is activated by the carriage, and are disabled when a limit switch LS2 is activated.

With the limit switch LS1 activated, the automotive body B advances, while rotating, into the effective zone of sensors S1 and S2, where, when two conditions are satisfied at the same time, that is, when the beam of the sensor S1 is interrupted by the body while the beam of the sensor S2 is not interrupted, a piston rod 13' of actuator cylinder 13 is extended. The forward end of piston rod 13' is connected to the upper end of a lever (not shown), which is connected at its lower end to a horizontal shaft rotatably mounted on a frame F. A toggle link 14 is connected between this horizontal shaft and the free end of a tilt lever 16 one end of which is pivotally connected by a pin 15 to frame F. The tilt lever 16 carries sprocket 12 around which endless chain 8 extends. When piston rod 13' extends, toggle link 14 folds, and tilt lever 16 tilts downward about pin 15. Thus, sprocket 12 moves downward to move chain 8 away from the engagement with sprocket 7, interrupting the transmission of rotating power to the automobile body B.

When the light beam of the body sensor S1 is interrupted while the light beam of sensor S2 is not interrupted, body B is in its erect position. When the body is erect, rotating power is removed, but the body continues to move past its erect position because of its inertia. Because the combined center of gravity of body B and support arms 3A and 3B is located below the axis of rotation of shafts 2A and 2B, the body will reverse direction and rock back and forth until it reaches a stable erect condition. Because rotating power is removed from the automobile body when it is substantially erect. the magnitude of the rocking motion of the body is small, and the time interval from the interruption of power until the body stops rocking is minimized.

After the transmission of rotating power to body B is interrupted, body B is carried forward on carriage 1 while the rocking motion takes place. After sprocket 7 passes over sprocket 12, limit switch LS3 is actuated, and causes piston rod 13' to contract, moving the tilt lever 16 upward to return chain 8 to its upper position. When in its upper position, chain 8 can continue to rotate the sprocket on the following carriage until the automobile body on that carriage reaches a location on the coating line at which its rotation is to be stopped and rotates to its erect attitude.

Actuation of limit switch LS1 places sensors S1 and S2 in an operative state, while the limit switch LS2 holds sensors S1 and S2 in the inoperative state. Limit switch LS1 is not actuated until the carriage reaches the end of the baking and drying stage, which is the position in which rotation of the automobile body is to be stopped. The sensor-enabling operation of limit switch LS1, therefore, prevents tilt lever 16 from being accidentally lowered, for example, if a worker passes sensors S1 and S2.

With the conveying apparatus in accordance with the invention, when the article to be painted, which is rotating on an advancing carriage, reaches the end of the baking and drying stage, and the sensors, operating together, determine that the body has rotated to its erect attitude, chain 8 is tilted downward to disengage from sprocket 7 on carriage 1. Since the combined center of gravity of the article to be painted and the support arms is located directly below the axis of rotation, the article rapidly comes to rest in its erect attitude, with a diminishing rocking motion, within a minimum time of rocking. Since stopping of rotation of the article takes place without impact, shock is eliminated. Moreover, forward motion of the carriage can continue as the rotation of the article is stopped. It is therefore possible to stop the article in its erect position quickly, without impact, and without interrupting the forward motion of the article.

Various modifications can be made to the apparatus described. For example, the sprocket which engages the chain which delivers rotating power to the article can be located at the forward end of the carriage, provided that the chain is appropriately positioned. Other types and arrangements of body attitude sensors can be used. Still other modifications can be made without departing from the scope of the invention as defined in the following claims.

We claim:

1. A conveying apparatus for a coating line comprising;

rail means;

a carriage movable along and guided by said rail means, said carriage comprising front and rear upright columns and front and rear rotating shafts mounted respectively in said columns for rotation on a common axis substantially parallel to said rail means;

support arm means on said shafts for supporting an article to be painted with the combined center of gravity of said article and said support arm means being directly below said axis when the article is in an erect attitude;

conveyor chain means for moving said carriage along said rail means;

means providing an endless chain for effecting rotating of said article;

said conveyor chain means and said endless chain means being juxtaposed in parallel relationship to each other along said rail means and movable relative to each other;

sprocket means on said carriage engageable with said endless chain;

means connecting one of said rotating shafts in driving relationship to said sprocket means;

means for sensing when said article is in an erect attitude, said sensing means being mounted at a predetermined positioned along said rail means; and means, responsive to said sensing means, for effecting disengagement of said endless chain from said carriage sprocket when the article is in an erect attitude at a predetermined position in the path of said carriage;

whereby the rotating force transmitted from said endless chain means to said article is removed when the article is substantially in its erect attitude and said article rapidly approaches a stable erect condition by rocking motions of diminishing magnitude without the application of impact forces.

* * * * *